Patented May 17, 1932

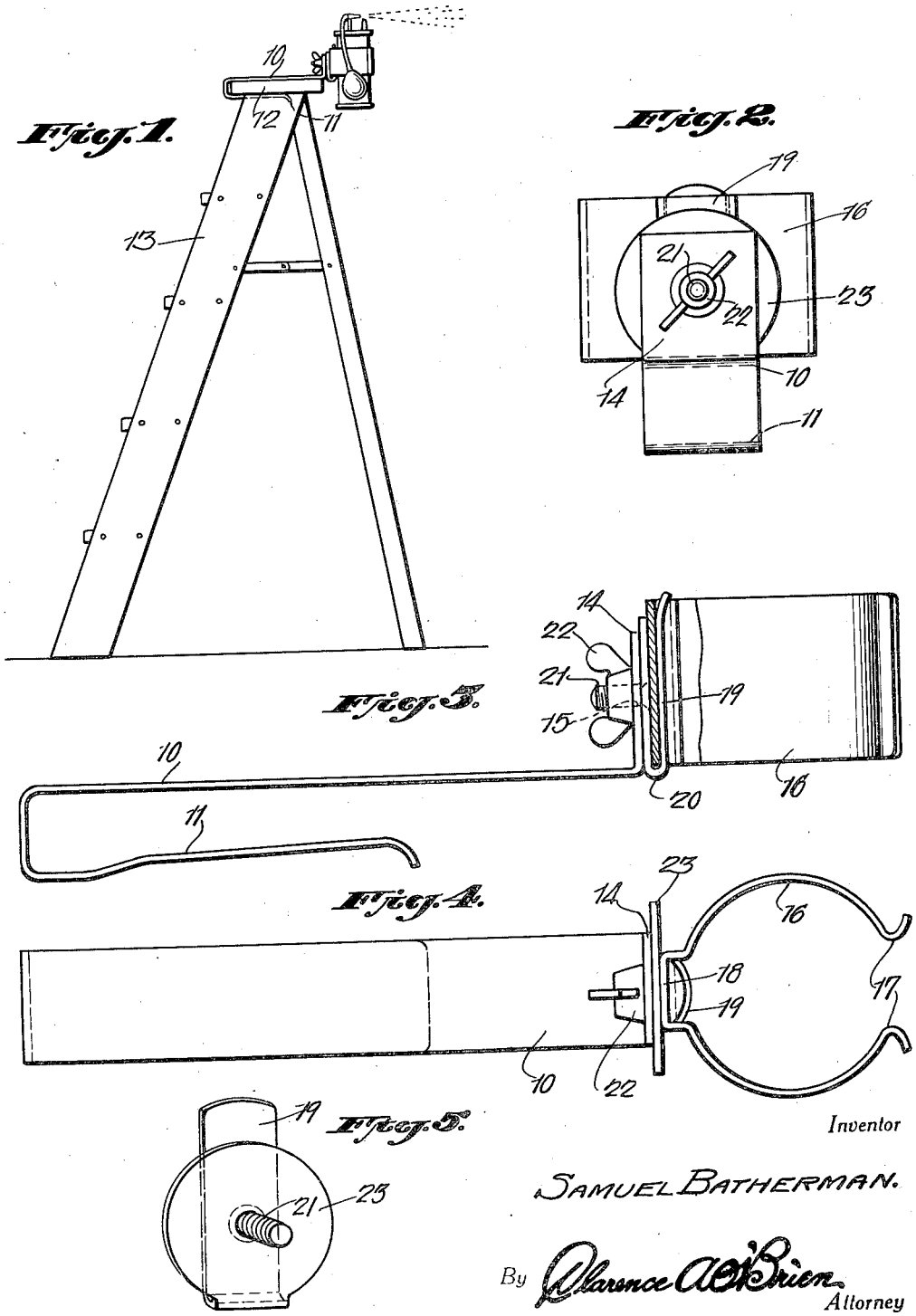

1,858,656

UNITED STATES PATENT OFFICE

SAMUEL BATHERMAN, OF BRONX, NEW YORK

SUPPORT FOR BLOWTORCHES

Application filed June 13, 1930. Serial No. 460,949.

The present invention relates to new and useful improvements in supports and similar devices, and more particularly it pertains to a holding device adapted for supporting a blow torch such as commonly used by electricians and other mechanics.

It is an object of the invention to provide a device of the aforementioned character which may be removably attached to any convenient support, and which includes a resilient clasp with which a blow torch or other similar device may be readily engaged and disengaged for the purpose of supporting the same.

It is a further object of the invention to provide a device which, while highly efficient in use, is at the same time sufficiently small as will permit of it being readily transportable in a mechanic's kit.

A still further object of the invention resides in the provision of such a device which is capable of adjustment to angular positions, in order to support a blow torch in various angular positions relative to a certain fixed piece of work to be operated on.

With the above and other objects in view, reference is had to the accompanying drawings, wherein;

Figure 1 is a view in side elevation illustrating a step ladder with a device constructed in accordance with the present invention attached to the top step of the step ladder, Figure 2 is a view in front elevation of the device, Figure 3 is a view in section of the device, a portion thereof being shown in elevation, Figure 4 is a top plan view of the device, and;

Figure 5 is a detail perspective view of a portion of the device.

Referring to the drawings by reference characters, the device comprises a resilient clamp member 10 having a spring end 11 spaced with respect to the body portion of the clamp, and said clamp is adapted to engage a suitable support such as the top step 12 of a step ladder 13 in the manner illustrated in Figure 1. The main body portion of the clamp is provided with a right angular or upstanding portion 14, which in turn is provided with an opening 15, the purpose of which will be hereinafter described.

The blow torch or other article to be supported is adapted to be embraced by a resilient clip 16 of substantially circular form, having outwardly flared ends 17 which serve to spread the member 16 when engaged by the article to be supported therein. The resilient member 16 has an offset portion 18, and this offset portion is adapted to receive one of the legs 19 of a substantially U-shaped member 20 as illustrated in Figure 3. The other leg of the U-shaped member 20 carries a bolt or the like 21, and this bolt 21 is adapted to pass through the opening 15 in the angular end 14 of the resilient clamp 10 as shown in Figure 3, and also to receive a wing nut or the like 22, by means of which the U-shaped member 20 is secured to the resilient clamp 10.

The U-shaped member 20 heretofore described, has an enlarged body portion 23 by means of which the screw 21 is carried as illustrated in Figure 5 and this portion 23 forms a flange bearing with the outer face of the angular end 14 of the resilient clamp 10 as more clearly illustrated in Figure 4.

From the foregoing it will be apparent that the present invention provides a new and novel device for supporting such articles as blow torches or other articles used by electricians and similar mechanics when the same are not in use. Furthermore it will be obvious that the resilient member 10 may be attached to any suitable support, and the torch may be held in a position to direct its flame against a piece of work to be operated upon without necessitating the holding of the torch in the hand of the mechanic, thus leaving the mechanic's hands free for other purposes.

While the invention has been herein illustrated in what may be termed a preferred form, it is to be understood that the invention is not to be limited to the precise construction herein set forth, and that it may be practiced in other forms without departing from the spirit of the appended claims.

Having thus described the invention, what

I claim as new and desire to secure by U. S. Letters-Patent, is:

1. A device of the character described comprising a resilient support engaging member formed from a strip of resilient metal bent upon itself to form two spaced parallel legs, a perforated right angular extension projecting from one of the legs of said support engaging member, a U-shaped resilient clip having an enlarged body portion adapted for bearing engagement with the right angular extension of the support engaging member, means for securing said U-shaped clip to said right angular extension of the support engaging member, and an article embracing resilient clip carried by said U-shaped clip.

2. A device of the character described comprising a resilient support engaging member formed from a strip of resilient metal bent upon itself to form two spaced parallel legs, a perforated right angular extension projecting from one of the legs of said support engaging members, a U-shaped resilient clip having an enlarged body portion adapted for bearing engagement with the right angular extension of the support engaging member, a bolt carried by said U-shaped resilient clip and adapted to be received in the perforation of the right angular extension of the support engaging member, a nut engageable with said bolt to adjustably secure said U-shaped resilient clip to the support engaging member, and an article embracing clip removably carried by said U-shaped resilient clip.

In testimony whereof I affix my signature.

SAMUEL BATHERMAN.